United States Patent [19]

Niwayama

[11] Patent Number: 4,790,620
[45] Date of Patent: Dec. 13, 1988

[54] OPTICAL COUPLING DEVICE FOR A PHOTO-SEMICONDUCTOR ELEMENT AND AN OPTICAL FIBER

[75] Inventor: Kazuhiko Niwayama, Hyogo, Japan

[73] Assignee: Mitsubishi Denki Kabushiki Kaisha, Tokyo, Japan

[21] Appl. No.: 326,252

[22] Filed: Dec. 1, 1981

[30] Foreign Application Priority Data

Dec. 16, 1980 [JP] Japan ................. 55-178248

[51] Int. Cl.$^4$ .............. G02B 6/36; H01J 5/16; H01L 31/12
[52] U.S. Cl. ................. 350/96.20; 350/96.15; 350/96.17; 250/227; 357/17; 357/19
[58] Field of Search ............ 350/96.11, 96.15, 96.17, 350/96.20; 250/227; 357/17, 19

[56] References Cited

U.S. PATENT DOCUMENTS

| | | | |
|---|---|---|---|
| 3,987,300 | 10/1976 | Palmer | 250/227 |
| 4,065,203 | 12/1977 | Goell et al. | 350/96.15 |
| 4,186,994 | 2/1980 | Denkin et al. | 350/96.17 |
| 4,186,996 | 2/1980 | Bowen et al. | 350/96.20 |
| 4,257,672 | 3/1981 | Balliet | 350/96.17 |
| 4,479,698 | 10/1984 | Landis et al. | 350/96.20 |
| 4,610,746 | 9/1986 | Broer et al. | 350/96.15 X |
| 4,712,017 | 12/1987 | Kamasaki | 357/19 X |
| 4,725,128 | 2/1988 | Bornzin et al. | 350/96.17 |
| 4,744,623 | 5/1988 | Prucnal et al. | 350/96.20 |

FOREIGN PATENT DOCUMENTS

| | | | |
|---|---|---|---|
| 0010352 | 4/1980 | European Pat. Off. | 350/96.2 |
| 3004379 | 8/1980 | Fed. Rep. of Germany | 350/96.2 |

Primary Examiner—William L. Sikes
Assistant Examiner—Brian M. Healy
Attorney, Agent, or Firm—Sughrue, Mion, Zinn, Macpeak, and Seas

[57] ABSTRACT

An optical coupling device for coupling an optical fiber to a photo-semiconductor device wherein the light emitting end of the optical fiber is disposed in spaced relation to the light sensitive area of the photo-semiconductor device includes a light transmitting transparent resin completely filling the space between the end of the optical fiber and the light sensitive area of the photo-semiconductor device and a light reflecting resin film completely covering the exposed surface of the transparent resin.

3 Claims, 1 Drawing Sheet

4,790,620

OPTICAL COUPLING DEVICE FOR A PHOTO-SEMICONDUCTOR ELEMENT AND AN OPTICAL FIBER

BACKGROUND OF THE INVENTION

The present invention is directed to an optical coupling device and more specifically to an optical coupling device for coupling the light transmitting end of an optical fiber to the light sensitive area of a photo-semiconductor element with minimum loss of light.

A typical prior art optical coupling arrangement for transmitting light from the end of an optical fiber to the light sensitive area of a photo-semiconductor element is shown in FIG. 1. The photo-semiconductor element is comprised of a cathode 12, an $N_B$ layer 13, a $P_E$ layer 14, an $N_B$ layer 15, a $P_E$ layer 16, an anode 17 and a light receiving section 18 covered with a reflection preventing film 19. The reflection preventing film 19 is made from a polyimide or silicon oxide. An optical fiber 20 is arranged with the end face 20a disposed opposite the light sensitive area 18 in spaced relation thereto. The opposite end face of the optical fiber 20 which is not illustrated in FIG. 1 may be coupled to a photo-diode or any other suitable light source. Light from the photo-diode is transmitted through the optical fiber 20 and is emitted from the end face 20a. The light H emitted from the end face 20a reaches the light sensitive area 18 through the reflection preventing film 19 to trigger the photo-semiconductor element 10.

In the above-described prior art arrangement, the light H emitted from the end face 20a of the optical fiber 20 is in general spread angularly with respect to the central axis of the optical fiber. Therefore, a portion of the light H can spread laterally through the clearance between the end face 20a of the optical fiber and the upper surface 10a of the photo-semiconductor element thereby decreasing the quantity of light received by the light sensitive area 18.

SUMMARY OF THE INVENTION

The present invention provides a new and improved optical coupling device for coupling an optical fiber to an photo-semiconductor device wherein the space between the end face of the optical fiber and the light sensitive area of the photo-semiconductor is filled with a transparent resin the outer surface of which is covered with a reflecting resin film so that the light which is emitted from the end face of the optical fiber is efficiently collected by the light sensitive area. Any portion of the light which is scattered laterally will be reflected back by the interface between the transparent resin and the reflecting resin film so that loss of light is reduced.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
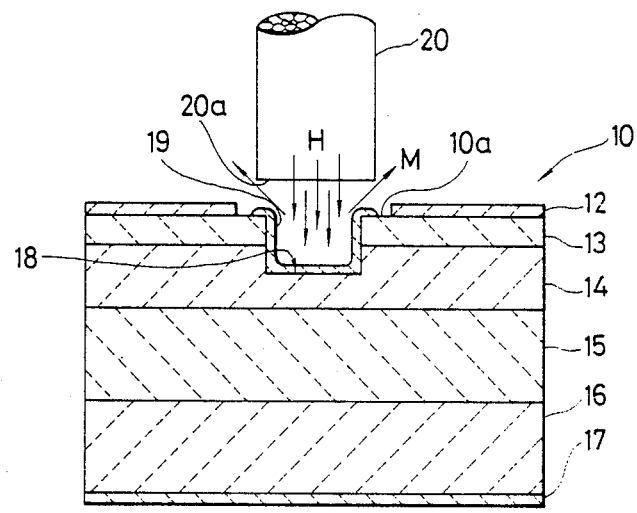
FIG. 1 is a partial sectional view of a prior art optical coupling arrangement for optically coupling an optical fiber to a photo-semiconductor element.
Figure 2:
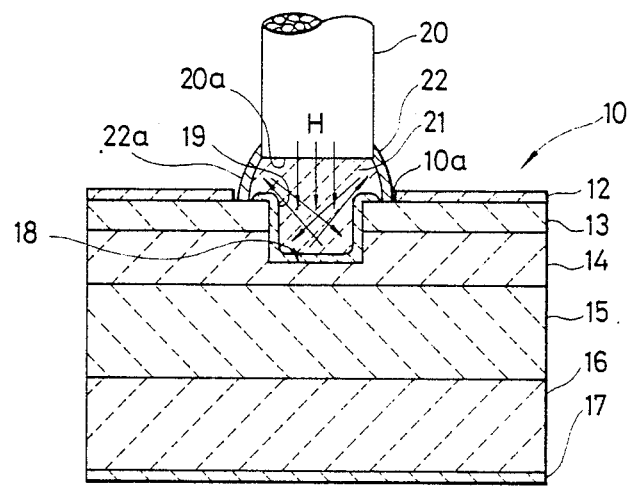
FIG. 2 is a partial sectional view of an example of an optical coupling device according to the present invention for optically coupling an optical fiber to a photo-semiconductor element.

The photo-semiconductor element 10 and optical fiber 20 as shown in the embodiment of FIG. 2 are identical to the corresponding elements shown in the prior art embodiment of FIG. 1 and therefore, are designated by the same reference numerals. However, according to the present invention, the space directly between the end face 20a of the optical fiber 20 and the light sensitive area 18 of the photo-semiconductor element 10 is completely filled with a transparent resin 21 such an epoxy resin. The transparent resin 21 is covered with a reflecting resin film 22 of opaque, white silicon rubber.

In the device according to the present invention, the light from the light source is transmitted through the optical fiber 20 and is emitted from the end face 20a into the transparent resin 11. In this case, the refracted index (n) of the transparent resin is larger than 1 (n>1) and the angle of spread of the emitted light H is smaller than that in a vacuum or in air having a refractive index n=1. If the transparent resin is an epoxy resin, the refractive index n is about 1.35. Therefore, the angle of spread of the light is much smaller than in the prior art arrangement of FIG. 1.

The light which tends to spread laterally is reflected back toward the light sensitive area 18 of the photo-semiconductor element by the interface 22a between the transparent resin 21 and the reflecting resin film 22 and collected at the light sensitive area 18. Thus, the loss of light is substantially reduced by the optical coupling device of the present invention.

The reflecting resin film 22 may be made of any opaque, white synthetic resin as long as it intercepts and reflects the light tending to escape between the end of the optical fiber and the upper surface of the photo-semiconductor element. For example, silicon rubber such as KE 45 or RTV 11 can be employed.

In the above-described example of the optical coupling device according to the present invention, the photo-semiconductor element 1 is a photo-thyristor but the invention is not limited thereto or thereby. That is, the technical concept of the invention is similarly applicable to other photo-semiconductor elements such as phototransistors or the like.

While the invention has been particularly shown and described with reference to a preferred embodiment thereof, it will be understood by those in the art that various changes in form and details may be made therein without departing from the spirit and scope of the invention.

What is claimed is:

1. An optical coupling device for a photo-semiconductor element having a light sensitive area and an optical fiber having one end face disposed opposite said light sensitive area of said photo-semiconductor element with a space therebetween wherein a reflection preventing film adapted to transmit light and to prevent optical reflection is disposed in contact with said light sensitive area to permit said light sensitive area to receive light emitted from the end face of said optical fiber, the improvement comprising a transparent light transmitting resin completely filling the space directly between said end face of said optical fiber and said reflection preventing film on said light sensitive area of said photo-semiconductor element whereby the light being transmitted by said light transmitting resin has a smaller angle of spread than in air and a film of light reflecting resin completely covering said transparent resin between the end face of the optical fiber and the reflection preventing film to prevent light from escaping outwardly from said transparent resin in the space between the end face of said optical fiber and said film on said light sensitive area of said photo-semiconductor element.

2. A device as set forth in claim 1 wherein said transparent light transmitting resin is an epoxy resin.

3. A device as set forth in claim 1 or 2 wherein said light reflecting resin film is comprised of white silicon rubber.

* * * * *